US012806696B2

(12) United States Patent
Steidle

(10) Patent No.: US 12,806,696 B2
(45) Date of Patent: Nov. 24, 2026

(54) EXPANSION SLEEVE FOR A HYDRAULIC EXPANSION CHUCK

(71) Applicant: Gühring KG, Albstadt (DE)

(72) Inventor: Christian Steidle, Albstadt (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 19/075,692

(22) Filed: Mar. 10, 2025

(65) Prior Publication Data

US 2025/0319525 A1 Oct. 16, 2025

(30) Foreign Application Priority Data

Mar. 12, 2024 (EP) .................................... 24162956

(51) Int. Cl.
*B23B 31/30* (2006.01)

(52) U.S. Cl.
CPC .......... *B23B 31/305* (2013.01); *B23B 31/302* (2013.01); *B23B 2231/24* (2013.01);
(Continued)

(58) Field of Classification Search
CPC ... Y10T 279/1216; Y10T 279/12–1291; Y10T 409/304312; Y10T 408/76;
(Continued)

(56) References Cited

U.S. PATENT DOCUMENTS 6,280,126 B1 8/2001 Slocum et al.
6,537,000 B1 3/2003 Wock
(Continued)

FOREIGN PATENT DOCUMENTS

DE 10007074 A1 * 9/2001
DE 10 2008 060 374 A1 3/2010
(Continued)

OTHER PUBLICATIONS

Machine Translation of DE 10007074 A1, which DE '074 was published Sep. 6, 2001.*
(Continued)

*Primary Examiner* — Erica E Cadugan
(74) *Attorney, Agent, or Firm* — Brown & Brown IP Law PLLC

(57) ABSTRACT

An expansion sleeve for the sealed insertion into an axial receiving opening of a base body of a hydraulic expansion chuck. The expansion sleeve has a sleeve body extending along a longitudinal central axis, which has a central clamping bore for receiving and clamping a cylindrical shank of a machining tool. On the outer circumference in the region of the clamping bore, the sleeve body has a jacket surface, which forms a radially elastically deformable material web, which revolves in a ring-shaped manner and which delimits a pressure chamber with the inner circumferential surface of the receiving opening. To clamp tools in the large spectrum of shank diameters, several recesses are formed in the sleeve body radially within the jacket surface, which recesses extend along the longitudinal central axis and are distributed around the clamping bore, and are closed with respect to the jacket surface and the clamping bore.

17 Claims, 4 Drawing Sheets

(52) U.S. Cl.
CPC ..... *B23B 2250/16* (2013.01); *Y10T 279/1216* (2015.01); *Y10T 279/1241* (2015.01); *Y10T 279/17111* (2015.01); *Y10T 408/76* (2015.01)

(58) Field of Classification Search
CPC ......... Y10T 279/17111; B23B 31/1178; B23B 31/1176; B23B 31/1172; B23B 31/30–31/305; B23B 2250/16; B23B 2231/24; B23B 2250/12
USPC ................ 279/4.03, 4.01–4.12, 20; 409/141; 408/143
See application file for complete search history.

(56) References Cited

U.S. PATENT DOCUMENTS

| | | | |
|---|---|---|---|
| 9,061,356 B2 | 6/2015 | Haimer | |
| 10,543,538 B2 | 1/2020 | Frota De Souza | |
| 12,337,396 B1 * | 6/2025 | Guo | B23B 31/305 |
| 2007/0252344 A1 | 11/2007 | Retzbach | |

FOREIGN PATENT DOCUMENTS

| | | |
|---|---|---|
| DE | 10 2009 049 582 B3 | 5/2011 |
| DE | 20 2011 004 231 U1 | 9/2011 |
| DE | 10 2011 106 421 B3 | 10/2012 |
| DE | 20 2012 104 969 U1 | 4/2013 |
| DE | 20 2015 105 500 U1 | 1/2016 |
| DE | 102016116164 A1 * | 3/2018 |
| DE | 10 2018 128 882 A1 | 5/2019 |
| EP | 1 085 958 B1 | 3/2001 |
| EP | 1 529 584 B1 | 11/2003 |
| KR | 102 593 929 B1 | 10/2023 |

OTHER PUBLICATIONS

Machine Translation of DE 102016116164 A1, which DE ’164 was published Mar. 1, 2018.*
European Search Report from a corresponding European patent application (EP 24 162 956) bearing a mailing date of Sep. 11, 2024.
Search Report from a German patent application (DE 10 2022 131 038.8) bearing a mailing date of Jul. 18, 2023.

* cited by examiner

Detail II (2:1)

EXPANSION SLEEVE FOR A HYDRAULIC EXPANSION CHUCK

The invention relates to an expansion sleeve for the sealed insertion into an axial receiving opening of a base body of a hydraulic expansion chuck, with a sleeve body extending along a longitudinal central axis.

Expansion sleeves of this type are used in many ways in order to clamp cutting tools with circular cylindrical clamping shank in a clamping bore with high concentricity. On the outer circumference in the region of the clamping bore, the sleeve body is equipped with a radially elastically deformable material web, which revolves in a ring-shaped manner, the outer jacket surface of which is designed so that, in the inserted state, it completes or forms, respectively, a closed pressure chamber with the inner circumferential surface of the receiving opening of a hydraulic expansion sleeve.

In order to clamp tools with smaller shank diameter, for example, all the way into regions of below 6 mm, so-called intermediate sleeves or reducing bushings or sleeves, which have longitudinal slots distributed over the circumference, are inserted into the clamping bore of the sleeve body, in order to provide them with the required elasticity for transmitting clamping forces.

Such expansion sleeve arrangements, which are equipped with intermediate sleeves, are described in the documents DE 20 2011 004 231 U1, DE 20 2015 105 500 U1, DE 20 2012 104 969 U1 and DE 10 2011 106 421 B3. It is also known, e.g., from the documents EP 1 529 584 B1 or DE 10 2008 060 374 A1 to use such intermediate sleeves in combination with shrink fit chucks.

It becomes apparent, however, that in the case of small shank diameters it is often difficult to build up a sufficiently high frictional connection between reducing bushing and tool shank. As a rule, the pressure in the pressure chambers with decreasing shank diameter has to be raised significantly. On the one hand, this can have a negative impact on the service life of the expansion sleeve and, on the other hand, pressurizations of this type have the result that the desired concentricity cannot be attained any longer over time due to the deformation of the expansion sleeve, which cannot be controlled any longer.

The invention is thus based on the object of creating an expansion sleeve, which can be inserted into a base body of a hydraulic expansion chuck and by means of which tools for a large shank diameter spectrum, but in particular also with small shank diameter, can be clamped reliably, without having to raise the clamping pressure even if extremely high torques between expansion sleeve and tool shank have to be transmitted.

This object is solved by means of an expansion sleeve with features described herein.

An expansion sleeve according to the invention for the sealed insertion into an axial receiving opening of a base body of a hydraulic expansion chuck comprises a sleeve body, which extends along a longitudinal central axis and which has a central clamping bore for receiving and clamping a cylindrical shank of a machining tool, wherein on the outer circumference in the length region of the clamping bore, the sleeve body has a jacket surface, which forms a radially elastically deformable material web, which revolves in a ring-shaped manner and which delimits a pressure chamber with an inner circumferential surface of the receiving opening. In other words, the jacket surface of the sleeve body forms a pressure chamber with the inner circumferential surface of the receiving opening when the sleeve body is inserted into the receiving opening of the base body, which pressure chamber is closed, except for a pressurized fluid supply point, which is formed, for example, by means of a branch channel, which leads into the pressure chamber.

According to the invention, several recesses are formed in the sleeve body radially within the jacket surface, which recesses extend along the longitudinal central axis and are distributed around the clamping bore, preferably spaced apart equiangularly, and are closed with respect to the jacket surface and the clamping bore. Tests have shown that it can be accomplished by means of this structure of the sleeve body, in the case of which a joining gap between expansion sleeve and intermediate bushing is not necessary, to convert the radial deformation of the material web uniformly and in a loss-free manner into a centered constriction of the clamping bore, so that the expansion sleeve can transmit large torques to the tool shank, which is received in the clamping bore, even if the inner diameter of the clamping bore is small and the pressure in the pressure chamber remains in ranges, which lead exclusively to elastic deformations of the expansion sleeve structure. The recesses can thereby have most varied cross-sectional shapes, and it is also not required that they extend axially parallel to the axis of the clamping bore.

The expansion sleeve according to the invention can thus be inserted into the axial receiving opening of a base body of a hydraulic expansion chuck as a unit, which is constructed in a compact manner, instead of the above-discussed expansion sleeve arrangement of an expansion sleeve and intermediate sleeve, which significantly simplifies the retrofitting of the hydraulic expansion chuck for clamping tools with small shank diameter.

Advantageous further developments are also described herein.

When the radially elastically deformable material web has, radially on the outer side, two annular grooves, which stand at an axial distance from one another and which preferably lie close to the axial end sections of the clamping bore, two expansion chambers are created in the simplest way, and the elastic deformability of the material web is evened out. It goes without saying that radially on the outer side, the radially elastically deformable material web can also have more than two annular grooves, which are distributed at intervals over the length region of the clamping bore.

Tests have shown that the deformation of the clamping bore is evened out even further when the recesses are connected to one another by means of a circumferential annular gap. The annular gap thereby advantageously has a radial extension in the range of a fraction of one mm. The annular gap is thereby preferably arranged so that it connects the radially outer end regions of the recesses.

An additional evening out of the radial deformation of the clamping bore is attained when on the inner circumference, the sleeve body has several coolant/lubricant slots, which are open towards the clamping bore and which, preferably spaced apart equiangularly, are distributed around the clamping bore and extend over the entire length of the clamping bore or clamping cavity, respectively, of the sleeve body.

When the coolant/lubricant slots and the recesses are present in equal numbers and are preferably arranged centrally offset angularly from the recesses, the distribution of the transmittable torque is further evened out over the circumference.

The elasticity of the structure can obtain a fine tuning via a radial overlap degree of recesses and coolant/lubricant slots.

In order to be able to better limit the vibration tendency of a tool, which is clamped into a hydraulic expansion chuck with expansion sleeve, it is advantageous when selected hollow spaces of the expansion sleeve, but at least the recesses, are filled with a damping material. This material can furthermore be used to finely balance the expansion sleeve.

The recesses can have a large variety of cross-sectional shapes and also do not have to be closed. If they are formed by closed chambers, however, a front-side collar, by means of which the expansion sleeve can be fixed to the hydraulic expansion chuck, can be embodied with higher strength.

The deformation behavior of the structure of the expansion sleeve can be controlled most easily in an advantageous manner in that the sleeve body is formed as a single piece by using a generative manufacturing method, such as, e.g., a 3D printing method. This production method makes it possible to manufacture the chambers in a closed manner, whereby, due to the production process, they are filled with unsintered or non-solidified, powdery material, respectively, thus resulting in positive damping properties.

When the sleeve body has, on its one axial end, a collar, which extends radially beyond the jacket surface for abutting against the base body of the hydraulic expansion chuck, this collar can be used in an advantageous manner for sealing the pressure chamber. The collar can additionally be used to close a channel for supplying the pressure chamber with hydraulic fluid.

The arrangement is then preferably such that the collar delimits an annular groove in the jacket surface, whereby installation space is saved.

Good results with regard to the torque, which can be transmitted with the expansion sleeve, result when the length of the recesses measured in the direction of the longitudinal central axis lies in the range of 0.8 to 0.9 times the length of the clamping bore.

The recesses can generally be interrupted by small webs in the axial direction. If they extend essentially over the entire axial length of the jacket surface in the axial direction, the material web can freely deform essentially over its entire length in the region of the recesses, whereby an evening out of the ring tensions in the material web is attained.

Tests were further able to show that the deformations of the expansion sleeve structure can be controlled well in particular when the radial extension of the recesses is selected so that it essentially corresponds to half the wall thickness of the material web.

The expansion sleeve can generally be used to clamp tools with large shank diameters of up to 32 mm. It can particularly advantageously be used when the inner diameter of the clamping bore lies in the range between 2.5 and 4.5 mm.

As already mentioned above, the constriction of the clamping bore can be evened out over the circumferential annular gap, which connects the recesses to one another. It was shown thereby that, for this purpose, it is already sufficient to provide the annular gap with a radial extension, which lies in the fraction range of one mm.

To produce a hydraulic expansion chuck, the expansion sleeve is inserted into an axial receiving opening of the base body with a defined joining clearance and is connected by means of a substance-to-substance bond, for example welded, to the base body for sealing the pressure chamber.

Exemplary embodiments of the invention are explained in more detail below on the basis of schematic drawings, in which.

Figure 1:
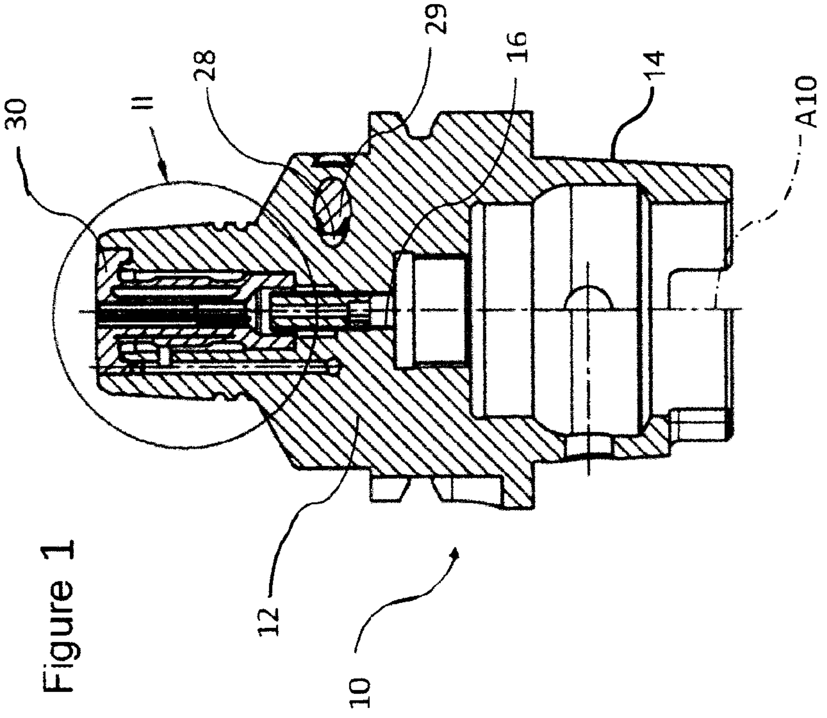
FIG. 1 shows a sectional view of a hydraulic expansion chuck with inserted expansion sleeve according to a first embodiment.
Figure 4:
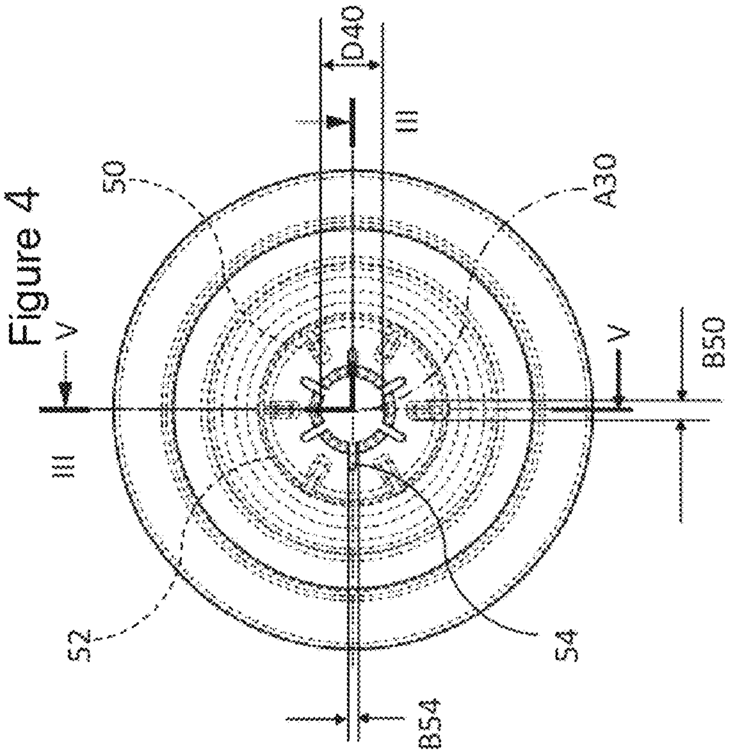
FIG. 4 shows a front view of the expansion sleeve according to FIG. 3.

A hydraulic expansion chuck, which has a base body 12, into which an expansion sleeve 30 with the central axis A30 is inserted, is identified with reference numeral 10 in FIG. 1. In the shown exemplary embodiment, the hydraulic expansion chuck with the central axis A10 is equipped with a hollow shank taper (HSK) 14 and is designed for an internal coolant/lubricant (KSM) supply. For this purpose, a KSM sleeve 18 is screwed into a central bore 16 of the base body 12, which protrudes into the expansion sleeve 30. It is important to note at this point that the hollow shank taper 14 is not crucial and the hydraulic expansion chuck can have a different clamping shank, for example a cylinder shank or steep shank taper, instead of the hollow shank taper 14. It is furthermore noted that an internal coolant/lubricant supply is not important for the invention.

The base body 12 of the hydraulic expansion chuck 10 has a receiving opening 31 with an inner surface 32 for the expansion sleeve 30, which is formed so that it delimits a closed pressure chamber 22, which is filled with pressurized fluid, of the length L22, in cooperation with the jacket surface 44 of the inserted expansion sleeve 30. This pressure chamber 22 is connected via a radial branch channel 24 to an axial pressurized fluid supply channel 26, via which pressurized fluid can be fed from a pressure generating chamber 28, which receives an actuating piston, into the pressure chamber 22.

The expansion sleeve 30 is inserted into the receiving opening 32 in a centered and sealed manner in such a way that not only the pressure chamber 22 but also the bore of the axial pressurized fluid supply channel 26 is closed. In the axially internal region, the expansion sleeve 30 has a first joining cylinder section 34, and, on the front side, a second joining cylinder section 36 in the design as radial collar, which is connected by means of a substance-to-substance bond, for example soldered, to the base body 12 of the hydraulic expansion chuck 10 for sealing the pressure chamber. A corresponding connection between expansion sleeve 30 and base body 12 can be selected in the region of the first joining cylinder section 34. The joining cylinder sections 34 and 36, via which the soldering to the base body 12 of the hydraulic expansion chuck takes place, are processed with high concentricity. The fits and tolerance specifications are selected so that the axes A10 and A30 in the assembled state of the expansion sleeve 30 are aligned as precisely as possible, so that the tool tension is ensured with the largest possible concentricity.

The structure of the expansion sleeve 30 will be described in more detail below with reference to FIGS. 2 to 5:

The expansion sleeve 30 has a sleeve body with three sections. An essentially circular cylindrical, radially elastically deformable material web 42, which revolves in a ring-shaped manner, lies between the joining cylinder sections 34 and 36, the radially external jacket surface 44 of which delimits the pressure chamber 22 when the expansion sleeve 30 is inserted in a fluid-tight manner into the base body 12 of the hydraulic expansion chuck 10. On the inner side, the material web 42 forms a circular cylindrical clamping bore or clamping cavity 40, respectively, for receiving and for clamping a tool shank. In the following, this centric clamping cavity will be identified throughout as clamping bore even if it is not manufactured as bore. The axial length of the clamping bore 40 is identified with L40 and it corresponds essentially to the length L22 of the pressure chamber 22. The diameter of the clamping bore is identified with D40 in FIG. 4.

Figure 3:
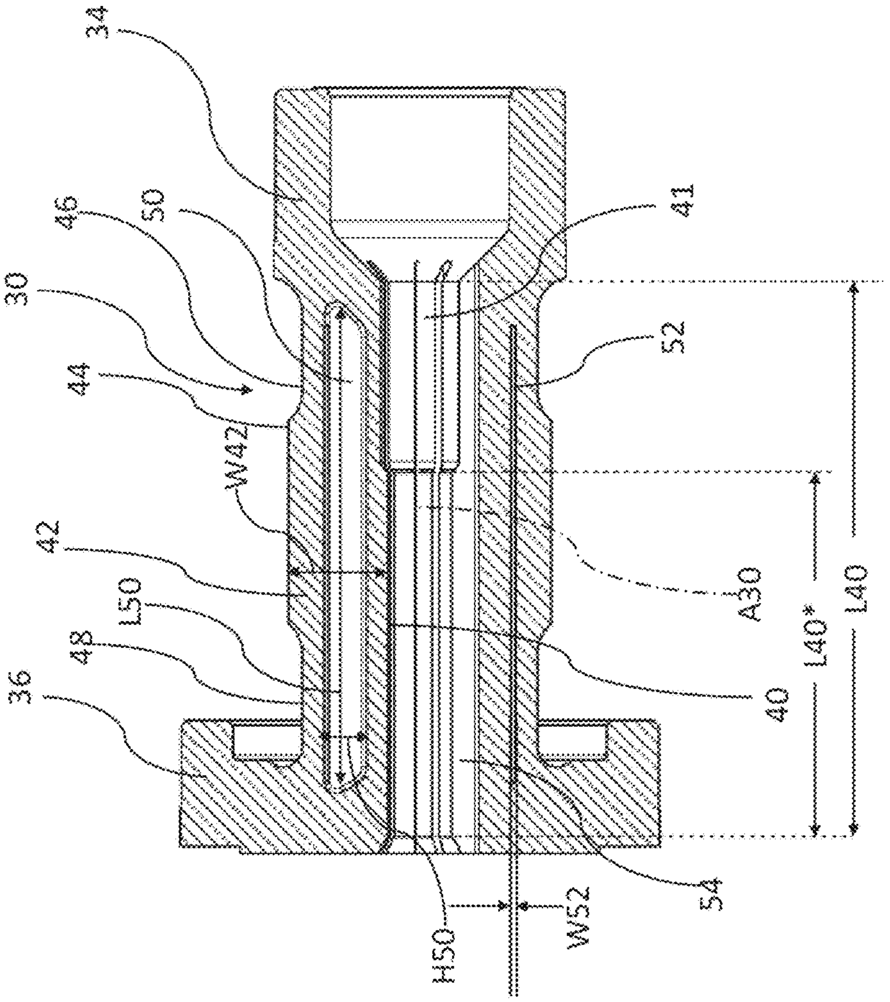
FIG. 3 shows a longitudinal section according to “III-III” in FIG. 4 of the expansion sleeve used in the exemplary embodiment according to FIGS. 1 and 2.

It can be seen from FIG. 3 that the clamping bore 40 in the shown exemplary embodiment is slightly expanded in the inner diameter on its end region 41 facing the joining cylinder section 34, so that an effective clamping length L40* results, which is shortened with respect to the measure L40. The shortening to the measure L40* is selected to be larger, the smaller the shank diameter of the tools to be clamped. This expansion of the clamping bore 40, however, is not an absolutely necessary feature, so that the inner diameter of the clamping bore 40 could also be identical over the entire length L40 of the clamping bore 40, whereby the effective clamping length L40* would be identical to the length L40.

Figure 2:
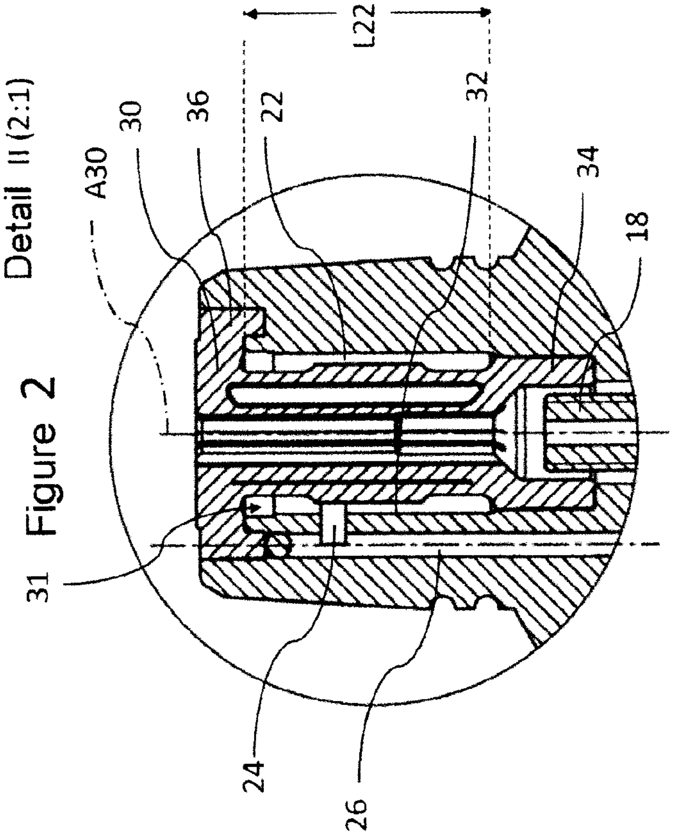
FIG. 2 shows the detail “II” in FIG. 1 in enlarged illustration.

Adjoining the joining cylinder sections 34 and 36, an annular groove 46 or 48, respectively, is in each case formed in the jacket surface 44. The annular grooves 46, 48 lying axially at a distance from one another, thus lie close to the axial end sections of the clamping bore 40 and, in the inserted state of the expansion sleeve 30—as can be seen in FIGS. 1 and 2—they form radial widenings of the pressure chamber 22 and weaken the wall thickness W42 of the material web 42 on the axial end regions, whereby the resilience of the material web 42 in response to pressurization of the pressure chamber 22 is increased and the stiffness of the material web 44 is simultaneously raised in its central section. In the illustrated exemplary embodiment, the annular groove 48 extends into the region of the joining cylinder section 3, which is formed as a collar, which radially protrudes beyond the jacket surface 44.

Figure 6:
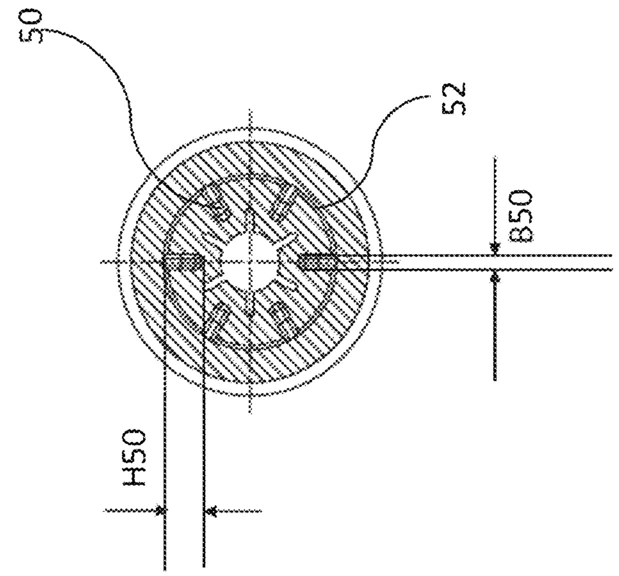
FIG. 6 shows the view of the section “VI-VI” in FIG. 5.
Figure 5:
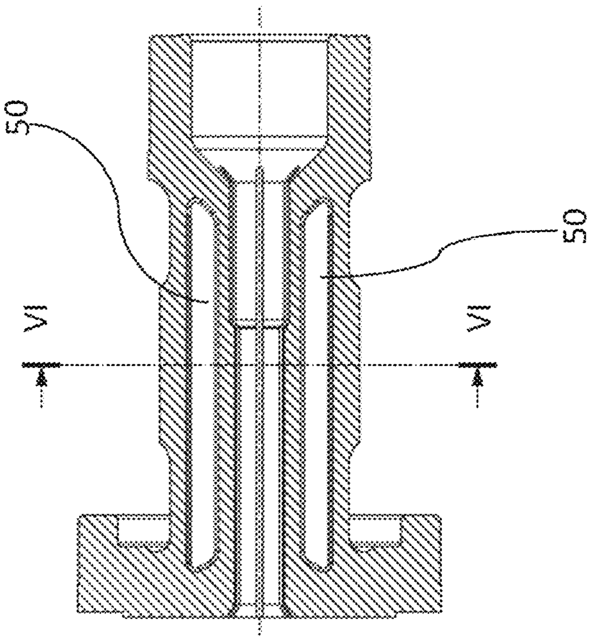
FIG. 5 shows the sectional view according to “V-V” in FIG. 4.

To control the radial constriction of the clamping bore 40 when applying pressurized fluid to the pressure chamber 22, several recesses 50 are formed in the material web 42 essentially centrally radially within the jacket surface 44, which recesses extend along the longitudinal central axis A30 and are distributed around the clamping bore 40, preferably spaced apart equiangularly, and are closed with respect to the jacket surface 44 and the clamping bore 40. In the shown exemplary embodiment, six such chambers 50 are provided, as can be seen from FIGS. 4 to 6, which are arranged at an angular distance of 60° from one another and which have a height H50, an axial length L50 and a width B50.

The recesses in the design of closed chambers 50 are connected to one another by means of a narrow, circumferential annular gap 52, wherein the annular gap 52 connects the radially outer end regions of the recesses 50. The radial width W52 of the annular gap 52 lies in the fraction range of one millimeter, for example between 0.1 and 0.3 mm.

In the central angular offset from the recesses 50, the sleeve body has, on the inner circumference, several regularly narrow coolant/lubricant slots 54, which are open towards the clamping bore 40 and which are distributed around the clamping bore and extend over the entire length of the sleeve body, so that coolant/lubricant (KSM) can flow along the clamped-in tool shank through the expansion sleeve 30 to the tool cutting edges. Due to the dimensioning and position of these coolant/lubricant slots 54, the radial resilience of the material web 42 can simultaneously be influenced or can be adapted to the deformation characteristic of the expansion sleeve 30, which is specified by means of the recesses 50.

The width B54 of the coolant/lubricant slots 54 routinely also lies within the millimeter range. In the case of an inner diameter of the clamping bore 40 of 3 mm, the measure B54 lies within ranges of 0.3 to 0.4 mm.

In the shown exemplary embodiment, the coolant/lubricant slots 54 and the recesses 50 are pulled so far radially outwards or inwards, respectively, that they slightly overlap one another in the radial direction.

In the shown exemplary embodiment, the recesses 50 are designed as hollow spaces. Tests have shown that the vibration tendency of a tool clamped into the hydraulic expansion chuck can be limited effectively when the recesses 50 are filled with a damping material. This filling can be formed most easily in that the sleeve body of the expansion sleeve 30 is formed in one piece by using a generative manufacturing method, such as, e.g., a 3D printing method. In that case, the recesses 50 have a closed design and are filled with non-solidified, molten or sintered, respectively, powdery material. The annular gap 52 also remains filled with powdery material thereby.

In tests, the following dimensions have turned out to be particularly advantageous:

The length L50 of the recesses 50 measured in the direction of the longitudinal central axis should lie in the range of 0.8 to 0.9 times the length L40 of the clamping bore 40.

The recesses 50 should preferably extend essentially over the entire axial length of the jacket surface 44 in the axial direction.

The radial extension H50 of the recesses 50 should essentially correspond to half the wall thickness W42 of the expansion sleeve 30, i.e., of the material web 42.

The above-described expansion sleeve 30 can be used to clamp tool shanks with a wide diameter spectrum. Special advantages compared to hydraulic expansion chucks, which operate with intermediate bushings, result when tools with very small shank diameters, for example of below 6 mm to below 2.5 mm are clamped. Exemplary dimensions are specified below for a hydraulic expansion chuck of this type.

The expansion sleeve 30 with an inner diameter D40 of the clamping bore 40 of 2.75 mm has an outer diameter of the material web 44 of 11 mm. The wall thickness W42 of the material web 42 thus lies in the range of 4 mm, in the region of the annular grooves at 3.55 mm. The total length of the expansion sleeve 30 is approximately 30 mm, the axial length of the radially elastically deformable material web and thus the axial extension L50 of the six recesses or chambers 50, respectively, which are evenly distributed over the circumference, lies at approximately 20 mm, the height H50 thereof at approximately 1.75 mm. The width B50 of the recesses 50 is approximately 1.5 mm. The length L40 of the clamping bore 40 then lies at approximately 24 mm, the effective clamping length L40* at approximately 17 mm. The cooling/lubricant slots 54, which are angularly offset from the recesses 50 by 30°, have a width B54 of 0.75 mm and a radial extension of approximately 1 mm. The annular gap 52 was embodied with a width W52 of 0.18 mm.

It has become apparent during the generative manufacture of the expansion sleeve that advantageous results can be obtained with the use of steel powders, the particle size of which lies in the range of between 30 and 60 μm, for example at 50 μm. In order to keep the solder connection to the base body 12 of the hydraulic expansion chuck 10 permanent and highly resilient, it is advantageous to obtain the steel powder from the same material as that of the base body 12 of the hydraulic expansion chuck 10. Good results with respect to elasticity and fatigue strength were attained with powders with particle sizes of 30 μm and 50 μm from the hot working steel X37CrMoV5-1 (material No. 1.2342). This material was machined at precision after suitable heat treatment by means of a stress relief heat treatment and was inserted into the base body of the hydraulic expansion chuck by means of a high-temperature soldering in the vacuum. Lastly, selected functional surfaces of the expansion sleeve were subjected to a curing and were annealed with low tension again.

Tests with a shank diameter of 4 mm were able to confirm that torques of 7.5 Nm at concentricity in the range of 0.002 to 0.004 mm can be realized by means of a hydraulic expansion chuck, which was fitted with an expansion sleeve of the above-described expansion sleeve structure.

It goes without saying that deviations from the described exemplary embodiment are possible without leaving the basic idea of the invention.

Figure 7:
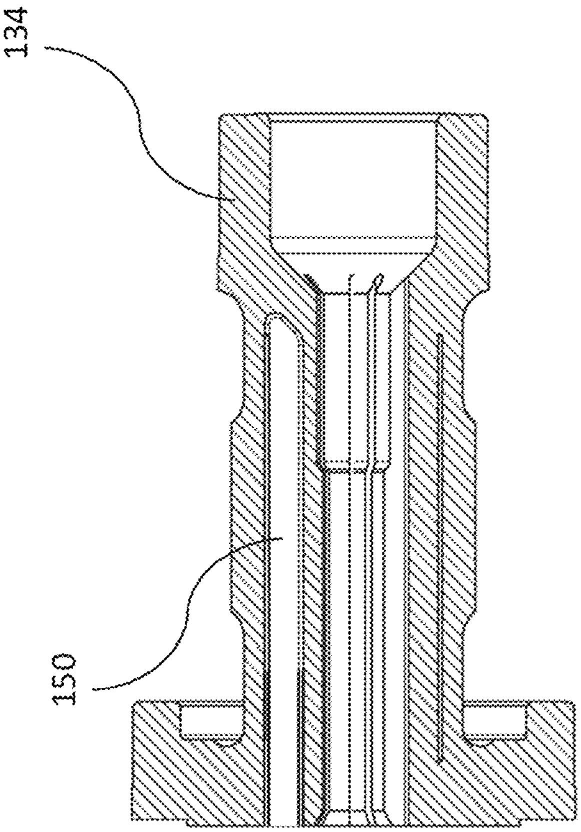
FIG. 7 shows a sectional view, which is similar to FIG. 3, of a modified exemplary embodiment of the expansion sleeve.

The recesses can thus have a cross section, which deviates from the shown rectangular cross section. They can also have at least one radial web, wherein the web can subdivide the chambers into sub-chambers lying axially one behind the other. In addition, the recesses 50 also do not have to be closed. FIG. 7 shows a variation, which is almost identical with respect to the structure to the embodiment according to FIG. 3, but in the case of which the recesses 150 are closed only on the side facing the joining cylinder section 134. The recesses can also be filled with a damping material.

Deviating from the above-described exemplary embodiment, the recesses can also run helically, at least in sections.

Deviating from the above-described exemplary embodiment, the recesses 50 and/or the annular gap 52 can be empty, i.e., not be filled with powdery material.

The invention thus creates an expansion sleeve for the sealed insertion into an axial receiving opening of a base body of a hydraulic expansion chuck. The expansion sleeve has a sleeve body, which extends along a longitudinal central axis and which has a central clamping bore for receiving and clamping a cylindrical shank of a machining tool. On the outer circumference in the region of the clamping bore, the sleeve body has a jacket surface, which forms a radially elastically deformable material web, which revolves in a ring-shaped manner, and which delimits a pressure chamber with an inner circumferential surface of the receiving opening. In order to be able to clamp tools in the large spectrum of shank diameters, in particular also with very small shank diameters with controllable pressures in the pressure chamber, several recesses are formed in the sleeve body radially within the jacket surface, which recesses extend along the longitudinal central axis and are distributed around the clamping bore, preferably spaced apart equiangularly, and are closed with respect to the jacket surface and the clamping bore.

The invention claimed is:

1. An expansion sleeve for insertion into an axial receiving opening of a base body of a hydraulic expansion chuck, the expansion sleeve comprising a sleeve body extending along a longitudinal central axis, the sleeve body comprising a central clamping bore for receiving and clamping a cylindrical shank of a machining tool, wherein on an outer circumference in a length region of the clamping bore, the sleeve body has a jacket surface, the sleeve body comprising a radially elastically deformable, ring-shaped material web, the jacket surface configured to, together with an inner circumferential surface of the receiving opening, delimit a pressure chamber, the sleeve body further comprising a plurality of recesses that are formed in the sleeve body radially within the jacket surface, the recesses extending along the longitudinal central axis, the recesses are distributed around the clamping bore, the recesses are closed with respect to the jacket surface and the clamping bore, and the recesses connected to one another by means of a circumferential annular gap, wherein the annular gap connects radially outer end regions of the recesses.

2. The expansion sleeve according to claim 1, wherein the material web has, radially on an outer side, two annular grooves, which stand at an axial distance from one another.

3. The expansion sleeve according to claim 2, wherein the two annular grooves are axially spaced from axial end sections of the clamping bore.

4. The expansion sleeve according to claim 1, wherein the sleeve body comprises an inner circumference, and on the inner circumference of the sleeve body, the sleeve body has a plurality of slots, which are open towards the clamping bore and which are distributed around the clamping bore and extend over the entire length of the clamping bore.

5. The expansion sleeve according to claim 4, wherein the slots and the recesses are present in equal numbers.

6. The expansion sleeve according to claim 5, wherein the recesses extend so far radially inwards in a radial direction that they overlap radially with the slots.

7. The expansion sleeve according to claim 4, wherein the slots are spaced apart equiangularly.

8. The expansion sleeve according to claim 5, wherein the slots and the recesses are offset angularly from each other.

9. The expansion sleeve according to claim 1, wherein the recesses are filled with a damping material.

10. The expansion sleeve according to claim 1, wherein the recesses are formed by closed chambers.

11. The expansion sleeve according to claim 1, wherein the sleeve body has, on one axial end, a collar, which extends radially beyond the jacket surface for abutting against the base body of the hydraulic expansion chuck.

12. The expansion sleeve according to claim 11, wherein the collar delimits an annular groove in the jacket surface.

13. The expansion sleeve according to claim 1, wherein a length of at least one of the recesses measured in a direction of the longitudinal central axis lies in the range of 0.8 to 0.9 times a length of the clamping bore.

14. The expansion sleeve according to claim 13, wherein the clamping bore has an axially internal end section, a diameter of the axially internal end section of the clamping bore is larger than a diameter of a second section of the clamping bore.

15. The expansion sleeve according to claim 1, wherein a radial dimension of each of the recesses is equal to half of a thickness of the material web.

16. A tool comprising an expansion sleeve as recited in claim 1 and a hydraulic expansion chuck, the expansion sleeve positioned within an axial receiving opening in the hydraulic expansion chuck.

17. The expansion sleeve according to claim 1, wherein the recesses are distributed around the clamping bore, spaced apart equiangularly.

* * * * *